United States Patent
Mrowiec et al.

(10) Patent No.: US 10,862,986 B2
(45) Date of Patent: Dec. 8, 2020

(54) DEVICE AND METHOD FOR ADJUSTING DATA COMMUNICATIONS IN PRESENCE SYSTEMS

(71) Applicant: MOTOROLA SOLUTIONS, INC., Chicago, IL (US)

(72) Inventors: Robert Mrowiec, Liszki (PL); Mariusz R. Wawrowski, Wawrzenczyce (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/636,091

(22) PCT Filed: Aug. 11, 2017

(86) PCT No.: PCT/PL2017/050038
§ 371 (c)(1),
(2) Date: Feb. 3, 2020

(87) PCT Pub. No.: WO2019/031974
PCT Pub. Date: Feb. 14, 2019

(65) Prior Publication Data
US 2020/0162564 A1    May 21, 2020

(51) Int. Cl.
*H04W 4/02* (2018.01)
*H04L 29/08* (2006.01)

(52) U.S. Cl.
CPC .............. *H04L 67/22* (2013.01); *H04L 67/24* (2013.01); *H04W 4/02* (2013.01)

(58) Field of Classification Search
CPC ..... H04W 4/023; H04W 4/024; H04W 4/025; H04W 4/029; H04W 4/04; H04W 4/16; H04W 4/50; H04W 4/02; H04L 67/20; H04L 67/22; H04L 67/24; H04L 67/306
See application file for complete search history.

(56) References Cited

U.S. PATENT DOCUMENTS

| | | |
|---|---|---|
| 6,710,702 B1 | 3/2004 | Averbuch et al. |
| 8,307,038 B2 | 11/2012 | Gillum et al. |
| 8,327,001 B2 | 12/2012 | Oh et al. |
| 8,458,321 B2 | 6/2013 | Agulnik et al. |
| 2006/0031368 A1 | 2/2006 | deCone |
| 2008/0114776 A1* | 5/2008 | Sun .................. H04L 67/24 |
| 2009/0106677 A1 | 4/2009 | Son et al. |
| 2009/0143086 A1* | 6/2009 | Jeong .............. H04L 67/24 455/466 |

(Continued)

FOREIGN PATENT DOCUMENTS

WO    2008/083487 A1    7/2008

OTHER PUBLICATIONS

"International Search Report" dated Apr. 18, 2018 in PCT Application No. PCT/PL2017/050038, Filed Aug. 11, 2017.

Primary Examiner — Jean A Gelin
(74) Attorney, Agent, or Firm — Perry + Currier, Inc.

(57) ABSTRACT

A device and method for adjusting data communications in presence systems is provided. For a given communication device, of a plurality of communication devices, a controller of server determines a number of the plurality of communication devices that are actively watching presence data associated with the given communication device. Based on the number, the controller adjusts data communications of the given communication device.

18 Claims, 10 Drawing Sheets

(56) References Cited

U.S. PATENT DOCUMENTS

| | | | |
|---|---|---|---|
| 2010/0095362 A1* | 4/2010 | Boberg | H04M 3/42374 |
| | | | 726/7 |
| 2010/0099387 A1 | 4/2010 | So et al. | |
| 2010/0115072 A1 | 5/2010 | Payyappilly et al. | |
| 2010/0268767 A1* | 10/2010 | McColgan | H04L 67/24 |
| | | | 709/203 |
| 2011/0004942 A1* | 1/2011 | Boberg | H04L 51/043 |
| | | | 726/28 |
| 2011/0047558 A1 | 2/2011 | Agulnik et al. | |
| 2011/0131629 A1* | 6/2011 | Oh | H04L 67/24 |
| | | | 726/1 |
| 2012/0066463 A1* | 3/2012 | Rice | G06F 11/3006 |
| | | | 711/161 |
| 2012/0096115 A1* | 4/2012 | McColgan | H04L 67/24 |
| | | | 709/217 |
| 2013/0024949 A1* | 1/2013 | Baldwin | H04L 63/10 |
| | | | 726/28 |
| 2014/0143328 A1 | 5/2014 | Miller | |
| 2014/0199986 A1* | 7/2014 | Green | H04W 4/12 |
| | | | 455/418 |
| 2020/0005353 A1* | 1/2020 | Shibayama | G06Q 30/0242 |

\* cited by examiner

US 10,862,986 B2

DEVICE AND METHOD FOR ADJUSTING DATA COMMUNICATIONS IN PRESENCE SYSTEMS

BACKGROUND OF THE INVENTION

In presence systems, presence data (e.g. which may include location data) is transmitted from devices (e.g. including mobile devices) to a presence server, and the like, which may forward the presence data to other devices, for example watcher devices, which are subscribed to the presence data (e.g. of given devices). When there are many devices (e.g. both sending devices and watching devices), the transmitted data may require a lot of bandwidth in a network, which may overwhelm and/or overload network links and/or servers. Such overload may include buffering at sending devices (e.g. due to a wireless link being unavailable and/or overloaded), queuing at presence servers, network buffering, and the like. When such overload occurs, watching devices may experience delays in receiving subscribed presence data and/or may not receive the subscribed presence data. Hence, watching devices may not be able to accurately determine when a presence status of a watched device changes, for example from available to not available, and/or vice versa. Such a situation may be particularly problematic when the watching devices and watched devices are deployed to first responders dealing with mission critical systems and/or emergency situations; indeed, in these situations, stale presence data may be potentially dangerous.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
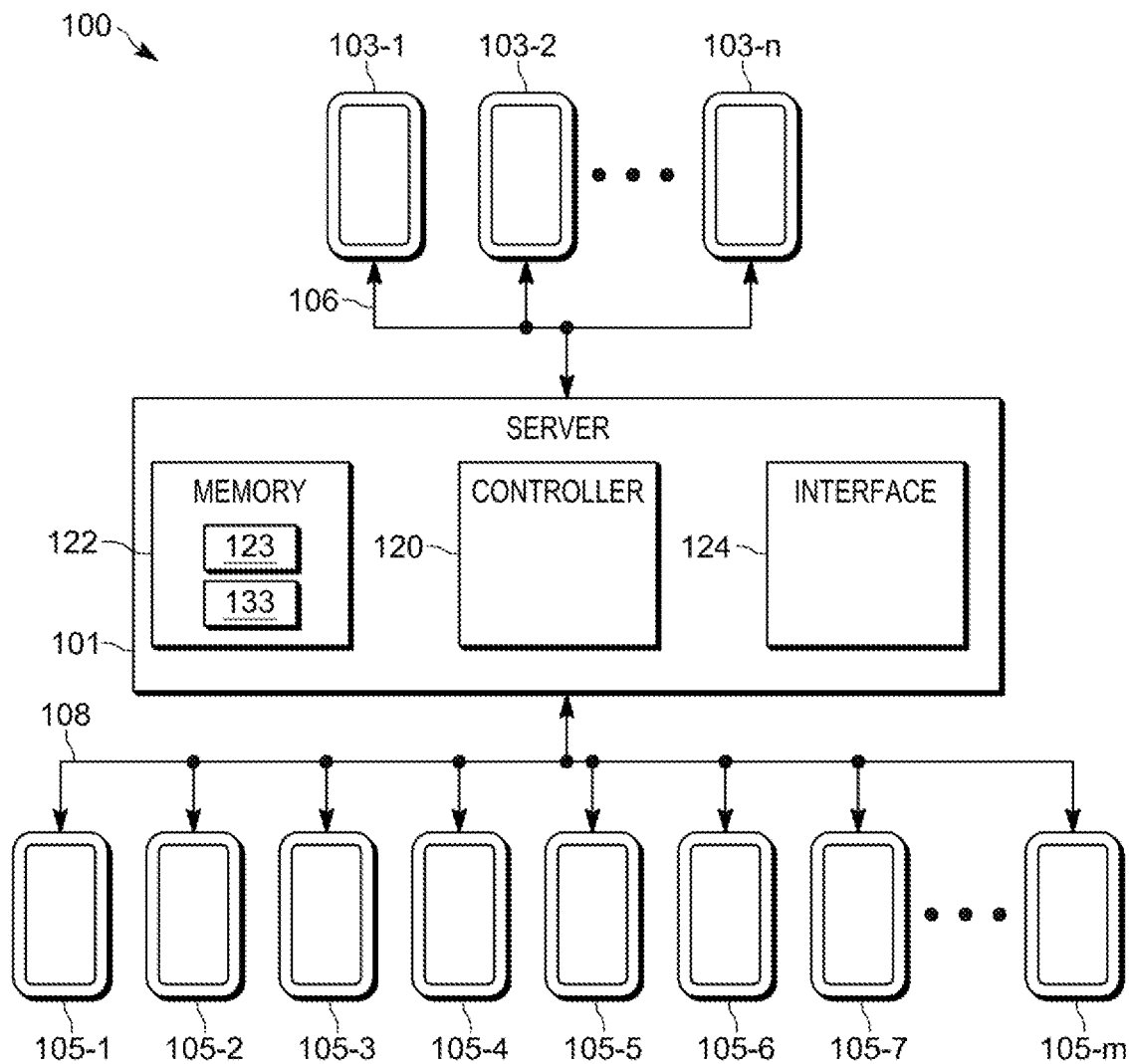
FIG. 1 is a block diagram of a system for adjusting data communications in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the present specification provides a server comprising: a communication interface configured to communicate with a plurality of communication devices; and a controller configured to: for a given communication device, of the plurality of communication devices, determine a number of the plurality of communication devices that are actively watching presence data associated with the given communication device; and based on the number, adjust data communications of the given communication device.

Another aspect of the present specification provides a method comprising: for a given communication device, of a plurality of communication devices, determining, using a controller, a number of the plurality of communication devices that are actively watching presence data associated with the given communication device; and based on the number, adjusting, using the controller, data communications of the given communication device.

FIG. 1 is a block diagram of a system 100 that includes a server 101, a plurality of communication devices 103-1, 103-2, ... 103-n, 105-1, 105-2, 105-3, 105-4, 105-5, 105-6, 105-7, ... 105-m. The plurality of communication devices 103-1, 103-2, ... 103-n will be interchangeably referred to hereafter, collectively, as devices 103, and generically as a device 103. Similarly, the plurality of communication devices 103-n, 105-1, 105-2, 105-3, 105-4, 105-5, 105-6, 105-7, ... 105-m will be interchangeably referred to hereafter, collectively, as devices 105, and generically as a device 105.

As depicted, the devices 103 are in communication with the server 101 and/or each other, using respective links 106; similarly, the devices 105 are in communication with the server 101 and/or each other, using respective links 108. As described in examples herein, one or more of the devices 103 may subscribe to presence data from one or more of the devices 105 via the server 101 and receive the presence data from one or more of the devices 105 via the links 106, 108. While present embodiments will be described with reference to the devices 103 subscribing to presence data from the devices 105, the devices 103 may also subscribe to presence data from each other; similarly, the devices 105 may also subscribe to presence data from the devices 103 and/or from each other.

Hence, in specific embodiments, the system 100 comprises components of a presence system, including, but not limited to, a presence system used to communicate with first responders and/or emergency responders, and the server 101 comprises a presence server and/or a presence device which controls presence subscriptions. As such, the server 101 may store subscription data indicative the devices 103 having subscribed to presence data for given devices 105 and/or types of presence data that is to be provided to the devices 103.

However, while the server 101 is described herein as specifically including a presence server, in other embodiments, the server 101 may be a computing device configured for presence server functionality; as such the server 101 may comprise a personal computer, a laptop computer, a mobile computing device, and/or any device configured for managing presence data associated with devices 103, 105. Indeed, in some embodiments, the server 101 may comprise one of the devices 103, 105.

The server 101 may receive presence data from the devices 105 and transmit the presence data to the devices 103 based on the subscription data. As such, the devices 103 may be referred to as "watching" the devices 105 (and/or as "watching" presence data associated with the devices 103); hence the devices 103 may alternatively be referred to as watching devices and/or watcher devices. Similarly, the devices 105 may be referred to as being "watched" by the devices 103 (and/or the presence data of the devices is "watched" by the devices 103); hence the devices 105 may alternatively be referred to as watched devices.

Furthermore, a device 103 may be referred to as "actively watching" presence data associated with one or more of the devices 105 when the device 103 is presently subscribed to presence data from the one or more of the devices 105, and/or when a device 103 has indicated an "interest" in receiving presence data from one or more of the devices 105. Such active watching and/or "interest" may be determined from the subscription data associated with the devices 103. For example, subscription data associated with a given device 103 may indicate that the given device 103 is to receive presence data from a device 105 that is presently off-line and/or unavailable (and that presence data is to be received when the device 105 is back on-line and/or becomes available and) and/or a time in the future that presence data is to be received from a device 105.

Such active watching and/or "interest" may also be indicated by associations of devices 103, 105 with talkgroups. For example, the devices 103-1, 105-2 may be associated with a same talkgroup but the device 103-1 may not be currently actively subscribed to presence data from the device 105-2. However, activity associated with the device 105-2 within the talkgroup may indicate potential interest of the device 103-2. For example, subscription data of the device 103-2 may indicate that presence data of devices 105 in the talkgroup may be automatically subscribed to when a given condition is met, for example when devices 105 in the talkgroup are called a given number of times with a given time period.

Indeed, as described below the server 101 may determine a number of the plurality of communication devices 103 that are actively watching presence data associated with a given communication device 105. Such a determination may include those communication devices 103 that were previously watching the presence data associated with the given communication device 103 within a given time period (e.g. an hour), even when those communication devices 103 may currently not be receiving presence data, and the like, from the given communication device 103. Such a given time period may be configurable at the server 101.

Furthermore, the watcher devices 103 may also provide presence data to the server 101. Indeed, as each of the devices 103, 105 may provide presence data to the server 101, and as each of the devices 103, 105 may subscribe to presence data from others of the devices 103, 105, the devices 103, 105 may alternatively be referred to as presentities and/or presentity devices, and the devices 103, 105 may be devices of a presence system.

A number "n" of the devices 103 may include as few as one device 103, but may include tens, hundreds and even thousands of devices 103 depending, for example, on a number of users and/or first responders and/or emergency responders being managed within the system 100. Similarly, a number "m" of the devices 105 may include as few as one device 105, but may include tens, hundreds and even thousands of devices 105 depending, for example, on a number of users and/or first responders and/or emergency responders being managed within the system 100. Furthermore, the devices 103, 105 and/or channels associated with the devices 103, 105 may be organized into talkgroups and the like.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

In some embodiments, one or more of the devices 103, 105 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments including non-mobile radios and non-mobile communication devices.

Furthermore, one or more of the devices 103, 105 may be incorporated into vehicles, and the like (for example emergency service vehicles), as a radio, an emergency radio, and the like.

Indeed, in some embodiments, one or more of the devices 103, 105 are specifically adapted for emergency service radio functionality, and the like, used by emergency responders and/or emergency responders, including, but not limited to, police service responders, fire service responders, emergency medical service responders, and the like. In some of these embodiments, the devices 103 further includes other types of hardware for emergency service radio functionality, including, but not limited to, push-to-talk ("PTT") functionality.

Figure 11:
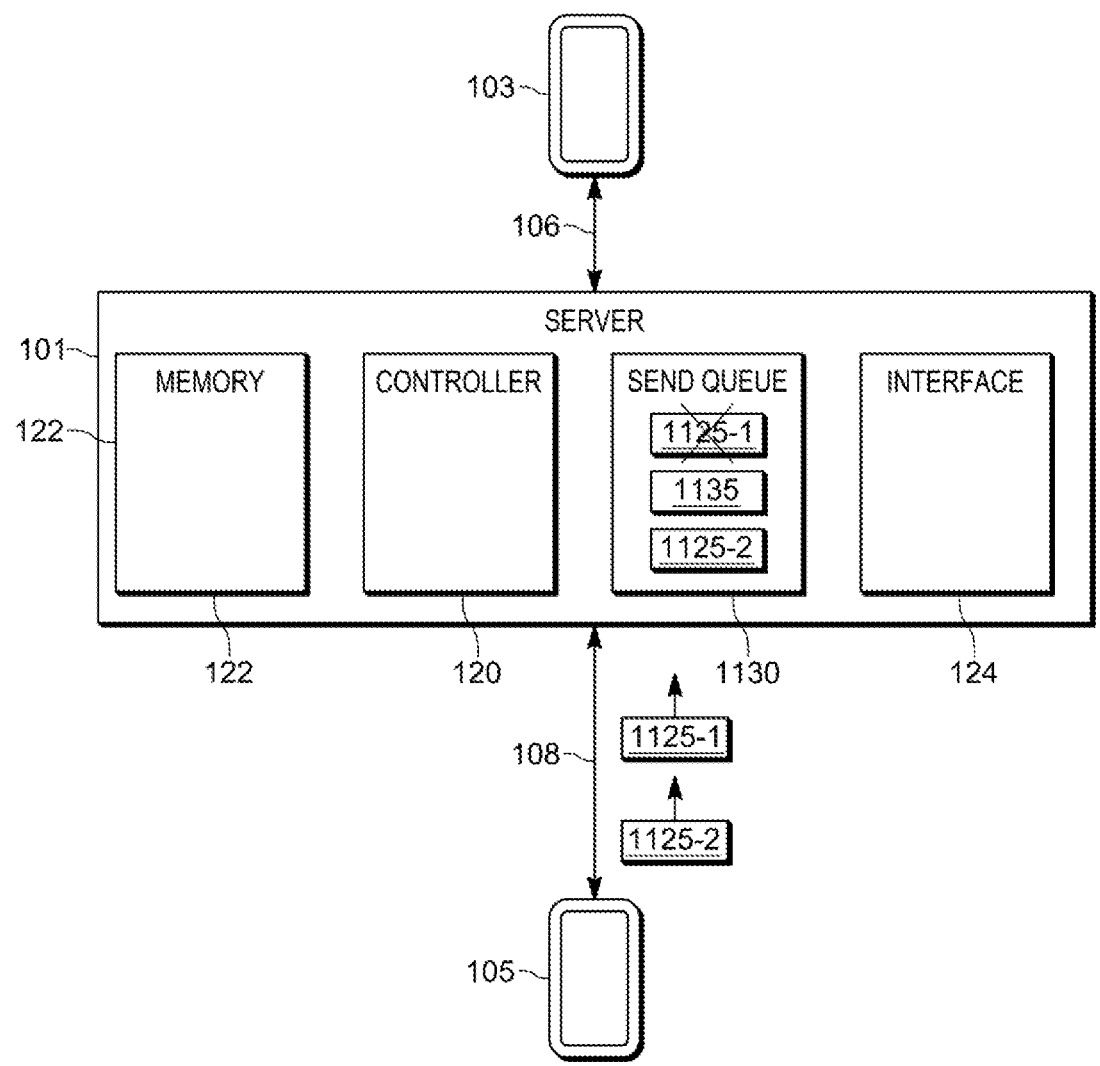
FIG. 11 depicts a portion of the system of FIG. 1 controlling a send queue in accordance with some embodiments.

Attention is next directed to the server 101 which comprises: a controller 120, a memory 122, storing an application 123, and a communication interface 124, interchangeably referred to hereafter as the interface 124. The controller 120 is generally configured for communication with the devices 103, 105, using the communication interface 124. The controller 120 is generally configured to: store and/or track presence data, which may include, but is not limited to, location data, associated with the devices 103; store and/or manage subscriptions of devices 103 to presence data of the devices 105; receive presence data from the devices 103; transmit presence data, received from the devices 103 (e.g. using a send queue as depicted in FIG. 11), to the devices 105 based on the subscription data; determine a number of active watchers (e.g. the communication devices 103) of a given communication device 105 and based on the number, adjust data communications of the given communication device 105, and the like. Indeed, the controller 120 may be configured to perform any functionality associated with a presence server.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the server 101 is not a generic controller and/or a generic device, but a device specifically configured to adjust data communications of a given communication device 105 based on a number of devices 103 which are actively watching the given communication device 105. For example, in some embodiments, the server 101 and/or the controller 120 specifically comprises a computer executable engine configured to implement specific data communications adjustment functionality.

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 1, programming instructions (e.g., machine readable instructions) that implement the functional teachings of the server 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement data communications adjustment functionality associated with the application 123. In the illustrated example, when the controller 120 executes the application 123, the controller 120 is enabled to: for a given communication device 105, of the plurality of communication devices 103, 105, determine a number of the plurality of communication devices 103 that are actively watching presence data associated with the given communication device 105; and based on the number, adjust data communications of the given communication device 105. As such, the application 123 may comprise a presence application used to implement a presence system. In some embodiments, the application 123 may further comprise a send queue management application to manage presence data in send queues (e.g. as shown in FIG. 11).

As depicted, the memory 122 further stores subscription data 133 associated with the devices 103. For example, the subscription data 133 may include identifiers of devices 103 respectively stored in association with one or more identifiers of the devices 105 to which presence data is subscribed, as well as one or more types of presence data that is subscribed to. For example, the subscription data 133 may indicate that the device 103-1 is subscribed to location data for each of the devices 105, while the device 103-2 is subscribed to location data only for the devices 105-1, 105-2. Similarly, the subscription data 133 may indicate that the device 103-1 is subscribed to an availability status of the devices 105. Indeed, the subscription data 133 may include identifiers of any type of presence data that may be determined by the devices 105 including, but not limited to, location data, availability status, activity data (e.g. a number of calls to a device 105), etc. Indeed, any type of presence data is within the scope of the present specification.

The interface 124 is generally configured to communicate with the devices 103, 105 using wired and/or wired links 106, 108 as desired, including, but not limited to, cables, WiFi links and the like. In other words, the links 106, 108 may include any suitable combination of wired networks and/or wireless networks.

In some embodiments, the interface 124 is further configured to communicate with the device 103, 105 for example, using one or more communication channels over the links 106, 108. In these embodiments, the interface is implemented by, for example, one or more radios and/or connectors and/or network adaptors, configured to communicate wirelessly, with network architecture that is used to implement one or more communication channels between the server 101 and the device 103, 105 and/or a wireless network. In these embodiments, the interface 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 124 includes one or more local area network or personal area network transceivers operating in accordance with an IEEE 902.11 standard (e.g., 902.11*a*, 902.11*b*, 902.11*g*, and the like), or a Bluetooth™ transceiver which may be used to communicate with the device 103, 105. In some embodiments, the interface 124 is further configured to communicate "radio-to-radio" on some communication channels (e.g. in embodiments where the interface 124 includes a radio), while other communication channels are configured to use wireless network infrastructure.

Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 124 communicates with the device 103, 105 using other servers and/or communication devices, for example by communicating with the other servers and/or communication devices using, for example, packet-based and/or internet protocol communications, and the like, and the other servers and/or communication devices use radio communications to wirelessly communicate with the device 103, 105.

Indeed, communication between the server 101, and the device 103, 105 may further include any suitable combination of wired networks and/or wireless networks. In other words, the links 106, 108 may include any suitable combination of wired networks and/or wireless networks.

In any event, it should be understood that a wide variety of configurations for the system 100 and/or the server 101 are within the scope of present embodiments.

Figure 2:
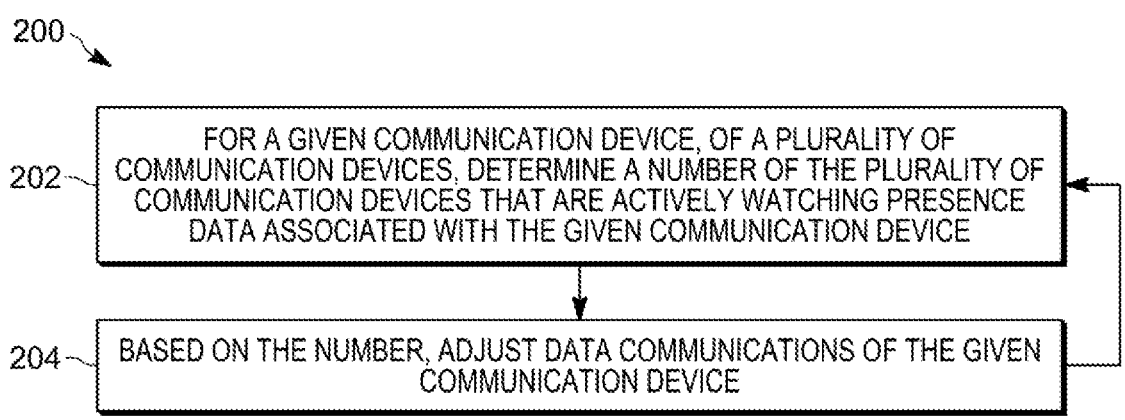
FIG. 2 is a flowchart of a method of adjusting data communications in presence systems in accordance with some embodiments.

Attention is now directed to FIG. 2 which depicts a flowchart representative of a method 200 for adjusting data communications of a given communication device based on a number of communication devices which are actively watching the given communication device. In some embodiments, the operations of the method 200 of FIG. 2 correspond to machine readable instructions that are executed by, for example, the server 101 of FIG. 1, and specifically by the controller 120 of the server 101. In the illustrated example, the instructions represented by the blocks of FIG. 2 are stored at the memory 122, for example, as the application 123. The method 200 of FIG. 1 is one way in which the system 100 and/or the server 101 and/or the controller 120 is configured. Furthermore, the following discussion of the method 200 of FIG. 2 will lead to a further understanding of the server 101, and its various components.

However, it is to be understood that the system 100 and/or the server 101 and/or the controller 120 and/or the method 200 may be varied, and need not work exactly as discussed herein in conjunction with each other, and that such variations are within the scope of present embodiments.

Furthermore, the method 200 of FIG. 2 need not be performed in the exact sequence as shown and likewise various blocks may be performed in parallel rather than in sequence. Accordingly, the elements of method 200 are referred to herein as "blocks" rather than "steps".

At the block 202, the controller 120, for a given communication device 105 of the plurality of communication devices 103, 105, determine a number of the plurality of communication devices 103 that are actively watching presence data associated with the given communication device 105.

At the block 204, the controller 120, based on the number, adjusts data communications of the given communication device 105.

Various embodiments of the method 200 is now described with regards to FIG. 3 through FIG. 9.

Figure 3:
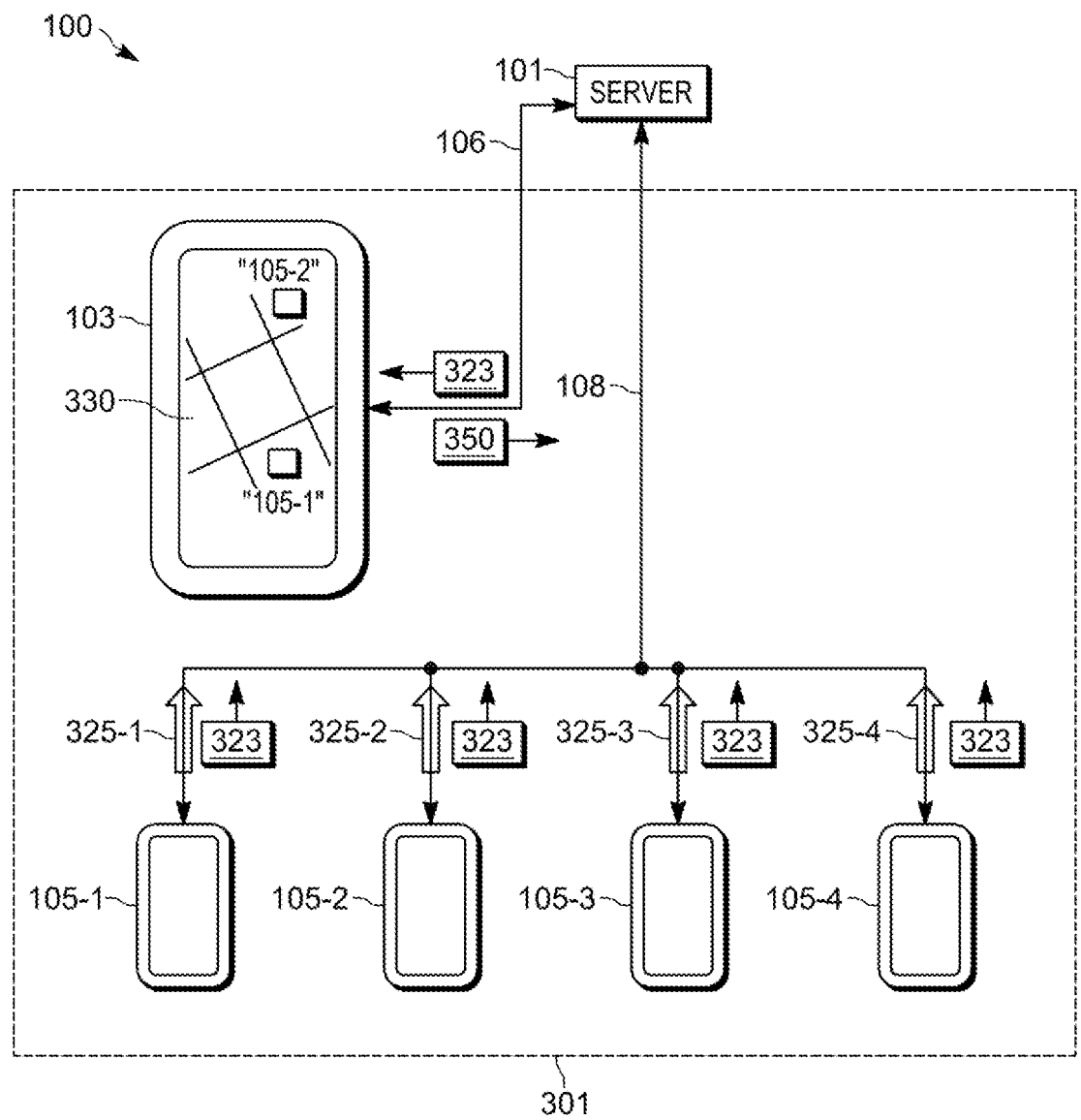
FIG. 3 depicts a portion of the system of FIG. 1 determining a number of watcher devices actively watching communication devices based on map data in accordance with some embodiments.

Attention is next directed to FIG. 3 which depicts a portion of the system 100 including five devices 103, 105-1, 105-2, 105-3, 105-4 associated with a talkgroup 301. While in the example of FIG. 3, only one device 103 is depicted, the talkgroup 301 may include more than one device 103 (and further more or fewer than four devices 105). While for convenience in FIG. 3, the server 101 is depicted as including only the controller 120 it is assumed that the other components of the server 101 are nonetheless present.

It is assumed in FIG. 3 that the device 103 (e.g. one of the devices 103 depicted in FIG. 1) is subscribed to presence data 323 from each of the devices 105-1, 105-2, 105-3, 105-4, and further that each of the devices 105-1, 105-2, 105-3, 105-4 is providing respective presence data 323 to the server 101 via the respective links 108.

Furthermore, the presence data 323 may be provided periodically and/or according to one or more of a presence update rate and/or an uplink rate. Hence, it is furthermore assumed in FIG. 3 that each of the devices 105-1, 105-2, 105-3, 105-4 is communicating with the server 101 using respective data communications settings (e.g. the presence update rate and/or the uplink rate), as represented by respective arrows 325-1, 325-2, 325-3, 325-4.

Figure 4:
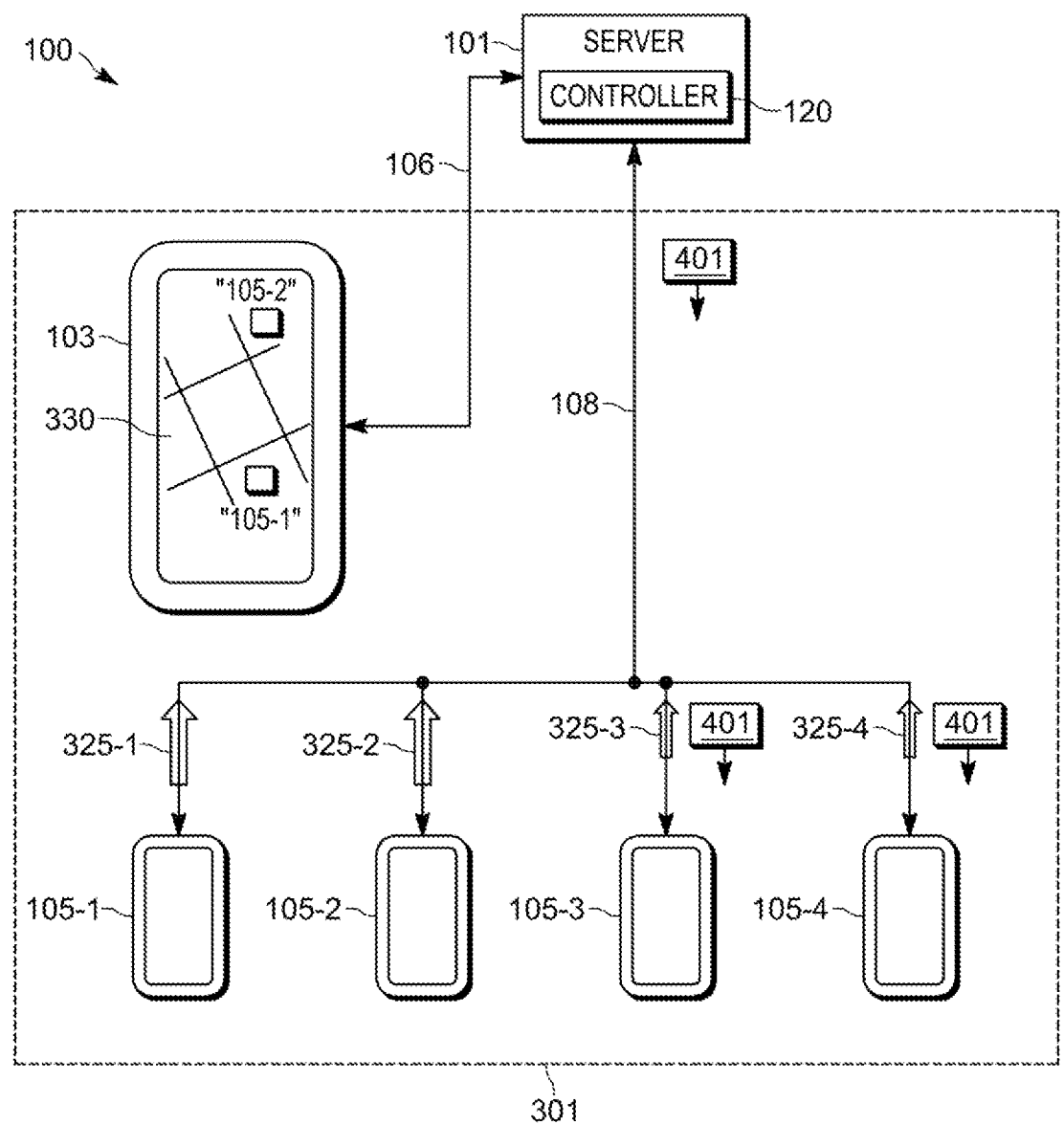
FIG. 4 depicts a portion of the system of FIG. 1 adjusting data communications of the communication devices in accordance with some embodiments.

It is yet further assumed in FIG. 4 that the presence data 323 includes a respective location of the devices 105-1, 105-2, 105-3, 105-4. As such, it is further assumed that each of the devices 105-1, 105-2, 105-3, 105-4 includes a location determining device including, but not limited to, a Global Positioning System (GPS) device, a triangulation device and the lie. In some embodiments, the server 101 stores the presence data 323, at least temporarily, for example at the memory 122.

As depicted, the device 103 receives (e.g. via a respective link 106) the presence data 323 associated with the devices 105-1, 105-2, 105-3, 105-4, including their respective locations. Furthermore, that the device 103 is being controlled (e.g. at a display device of the device 103) to provide a map 330 of a given region, the map 330 including an indication of a location (e.g. as received in the presence data) of each of the devices 105-1, 105-2 in the given region, but not of the devices 105-3, 105-4. In other words, a respective location of the devices 105-1, 105-2 is within the given region being provided in the map 330, but a respective location of the devices 105-3, 105-4 is outside the given region being provided in the map 330.

The device 103 further transmits map data 350 to the server 101, the map data 350 being indicative of the map 330 (e.g. the map data 350 may include geographic coordinates of the given region being provided at the display device of the device 103 including, but not limited to, coordinates of opposite corners of the map 330). Furthermore, the map data 350 be transmitted to the server 101 as a portion of presence data of the device 103.

In some embodiments, the map data 350 may include an indication that the locations of the devices 105-1, 105-2 are being provided at the map 330. In these embodiments, the server 101 (e.g. at the block 202 of the method 200) may determine from the map data 350 that the device 103 is actively watching the devices 105-1, 105-2, and not actively watching the devices 105-3, 105-4.

Alternatively, the map data 350 may not include an indication that the locations of the devices 105-1, 105-2 are being provided at the map 330; rather the map data 350 be indicative of the given region being provided at the map 330. In these embodiments, assuming the server 101 has at least temporarily stored the presence data 323, the server 101 and/or the controller 120 (e.g. at the block 202 of the method 200) may determine from the map data 350 and the presence data 323 that the device 103 is actively watching the devices 105-1, 105-2, and not actively watching the devices 105-3, 105-4.

Either way, the server 101 and/or the controller 120 determines that a number of devices 103 actively watching the devices 105-1, 105-2 is "1", and a number of devices 103 actively watching the devices 105-3, 105-4 is "0".

Attention is next directed to FIG. 4 which is substantially similar to FIG. 3 with like elements having like numbers. In FIG. 4, however, the server 101 is implementing the block 204 of the method 200, and it is assumed that the server 101 and/or the controller 120 has determined that a number of devices 103 actively watching the devices 105-1, 105-2 is higher than a number of devices 103 actively watching the devices 105-3, 105-4. Hence, the server 101 adjusts the data communications of the devices 105-3, 105-4 (e.g. at the block 204 of the method 200), for example by transmitting, to the devices 105-3, 105-4, a command 401 to decrease a presence update rate including, but not limited to, a location update rate.

Alternatively, the server 101 may allocate a lower uplink rate (and/or any other quality of service parameter) for the devices 105-3, 105-4 on the respective links 106 of the devices 105-3, 105-4.

Indeed, the server 101 may cause data communications of the devices 105-3, 105-4 device to be adjusted by modifying one or more of an application layer parameter (e.g. the presence update rate) and a transport layer parameter (e.g. the uplink rate) of the devices 105-3, 105-4. Such a data communication adjustment includes, but is not limited to, a bandwidth adjustment.

Either way, as depicted in FIG. 4, the data communications of the devices 105-3, 105-4 is altered (e.g. by lowering the presence update rate, the uplink rate, and the like) as represented by the arrows 325-3, 325-4 being smaller in FIG. 4 as compared to FIG. 3.

Put another way, the example of FIG. 3 and FIG. 4 shows that the server 101 and/or the controller 120 may be further configured to determine the number of the plurality of communication devices 103 that are actively watching the presence data associated with a given communication device 103 based on whether a location of the given communication device 103 is being provided at a respective map of the plurality of communication devices 103.

While the example of FIG. 3 and FIG. 4 has been described with respect to one watcher device 103, the talkgroup 301 may include any number of watcher devices 103 (including devices 105 that are watching others of the devices 105).

Furthermore, the determination of whether or not to adjust data communications of a given communication device 103 may be threshold based. For example, in the example of FIG. 3, the threshold value may be "1", in that when a number of devices 103 that are actively watching a given communication device 105 is less than "1", the server 101 and/or the controller 120 may cause data communications of the given communication device 105 to be adjusted.

For example, the server 101 and/or the controller 120 may be configured to cause data communications of a given communication device 105 to be adjusted by causing a decrease of a presence update rate of the given communication device 105 when a number of devices 103 actively watching the given communication device 105 is below a given threshold value (e.g., as depicted in FIG. 3 and FIG. 4, the given threshold value is "1"). In some of these embodiments, the server 101 and/or the controller 120 is further configured to cause the data communications of the given communication device 105 to be adjusted by sending a command to the given communication device 105 to decrease a presence update rate when the number of devices 103 actively watching the given communication device 105 is below the given threshold value.

Similarly, the server 101 and/or the controller 120 may be configured to cause the data communications of the given communication device 105 to be adjusted by causing allocation of a lower uplink rate of the given communication device when the number of devices 103 actively watching the given communication device 105 is below a given threshold value.

Regardless, presence data 323 of the devices 105-1, 105-2 is prioritized as there is more "interest" in the devices 105-1, 105-2, which may mitigate queuing and/or buffering at the devices 105-1, 105-2 as more bandwidth, and the like, is allocated for transmission of presence data from the devices 105-1, 105-2, as compared to the devices 105-3, 105-4. Furthermore, a reduction in the bandwidth, and the like of the devices 105-3, 105-4 may mitigate queuing and/or buffering at the server 101 as presence data from the devices 105-3, 105-4 will be received at a lowered rate.

Such mitigation queuing and/or buffering in the system 100 may be critical in first responder environments where it may be mission critical for first responders to have accurate presence data from devices that have a higher level of "interest" as indicated by a number of devices actively watching those devices.

Figure 5:
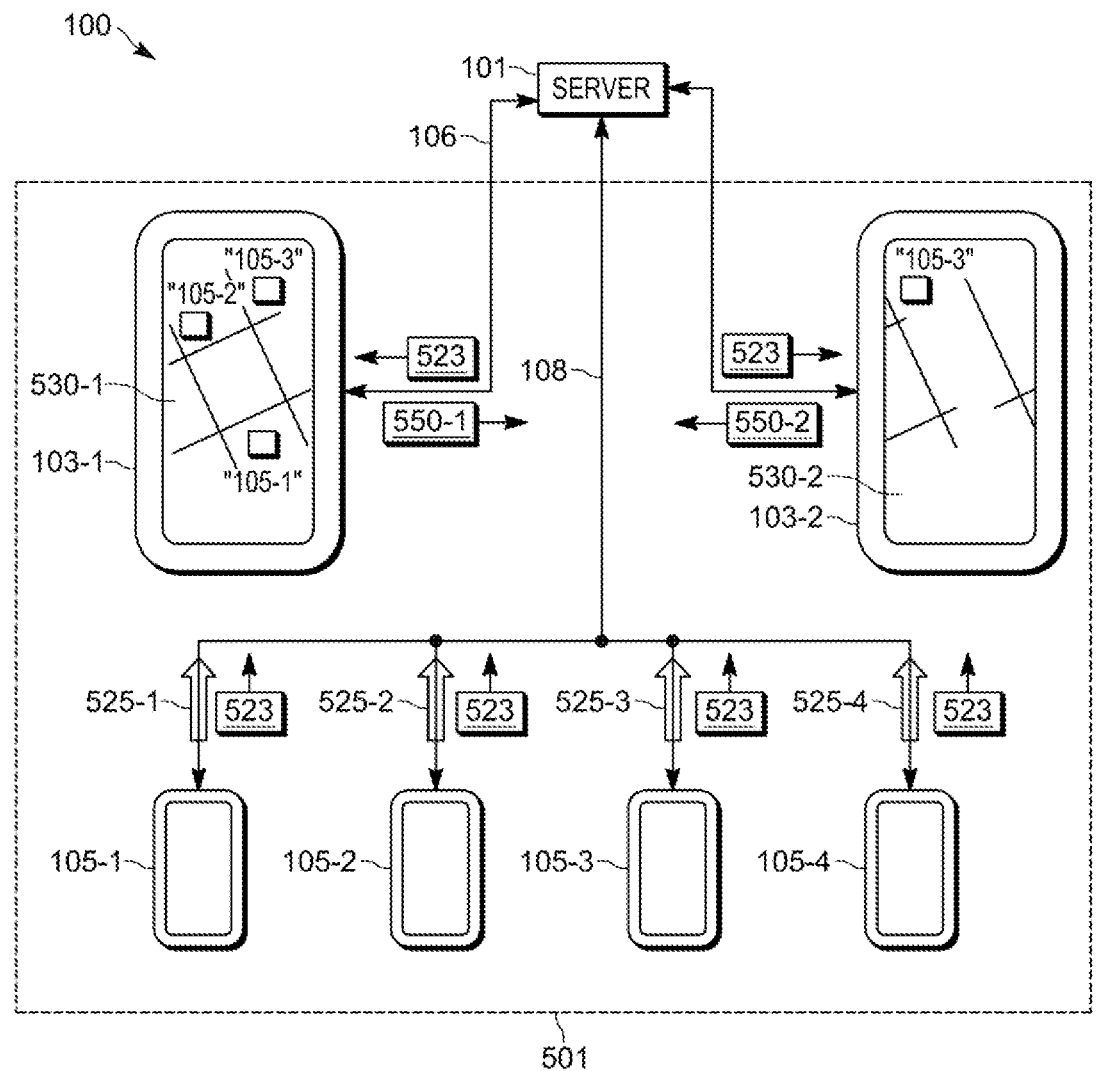
FIG. 5 depicts a portion of the system of FIG. 1 determining a number of watcher devices actively watching communication devices based on map data in accordance with some alternative embodiments.

Attention is next directed to FIG. 5 which depicts a portion of the system 100 including six devices 103-1, 103-2 105-1, 105-2, 105-3, 105-4 associated with a talkgroup 501. While in the example of FIG. 5, only two devices 103 are depicted, the talkgroup 501 may include more than two devices 103 (and indeed more than four devices 105). While for convenience in FIG. 5, the server 101 is depicted as including only the controller 120 it is assumed that the other components of the server 101 are nonetheless present.

As in the example of FIG. 3 and FIG. 4, it is assumed in FIG. 5 that the devices 103-1, 103-2 are subscribed to presence data 523 from each of the devices 105-1, 105-2, 105-3, 105-4, and further that each of the devices 105-1, 105-2, 105-3, 105-4 is providing respective presence data 523 (including location date) to the server 101 via the respective links 108, and that each of the devices 105-1, 105-2, 105-3, 105-4 is communicating with the server 101 using respective data communications settings (e.g. the presence update rate and/or the uplink rate), as represented by respective arrows 525-1, 525-2, 525-3, 525-4.

As depicted, the devices 103-1, 103-2 receive (e.g. via respective links 106) the presence data 523, including respective locations of the devices 105-1, 105-2, 105-3, 105-4, and furthermore the devices 103-1, 103-2 are being controlled (e.g. at respective display devices) to provide a respective map 530-1, 530-2 of a respective given region, the maps 530-1, 530-2 including respective indications of locations of the devices 105-1, 105-2, 105-3.

Indeed, as depicted, the map 530-1 of the device 103-1 includes a location of each of the devices 105-1, 105-2, 105-3 in a respective given region, but not of the device 105-4. Similarly, the map 530-2 of the device 103-2 includes a location of the device 105-3 in a respective given region, but not of the device 105-1, 105-2, 105-4.

Each of the device 103-1, 103-2 further transmits respective map data 550-1, 550-2 to the server 101, the map data 550-1, 550-2, being respectively indicative the maps 530-1, 530-2 (e.g. similar to the map data 550).

The server 101 and/or the controller 120 receives the map data 550-1, 550-2 and determines that a number of devices 103-1, 103-2 actively watching the device 105-3 is "2", a number of devices 103-1, 103-2 actively watching the devices 105-1, 105-2 is "1", and a number of devices 103-1, 103-2 actively watching the device 105-4 is "0". As such, the server 101 and/or the controller 120 may adjust the data communications of the device 105-1, 105-2, 105-3, 105-4 based on one or more of a threshold number and relative states of the devices the device 105-1, 105-2, 105-3, 105-4.

For example, the server 101 and/or the controller 120 may determine that: the device 105-3 has the highest number of devices 103-1, 103-2 that are actively watching it (e.g. two of the devices 103-1, 103-2), relative to the remainder of the devices 105-1, 105-2, 105-4; the devices 105-1, 105-2 each have the second highest number of devices 103-1, 103-2 that are actively watching them (e.g. one device 103-1), relative to the remainder of the devices 105-3, 105-4; and that the device 105-4, has the lowest number of devices 103-1, 103-2 that are actively watching it (e.g. zero devices 103-1, 103-2), relative to the remainder of the devices 105-1, 105-2, 105-3.

The server 101 and/or the controller 120 may then adjust data communications of each of the devices 105-1, 105-2, 105-3, 105-4 accordingly, for example allocating a highest presence update rate and/or uplink rate to the device 105-3, a second highest presence update rate and/or uplink rate to the devices 105-1, 105-2, and a lowest presence update rate and/or uplink rate to the device 105-4.

Figure 6:
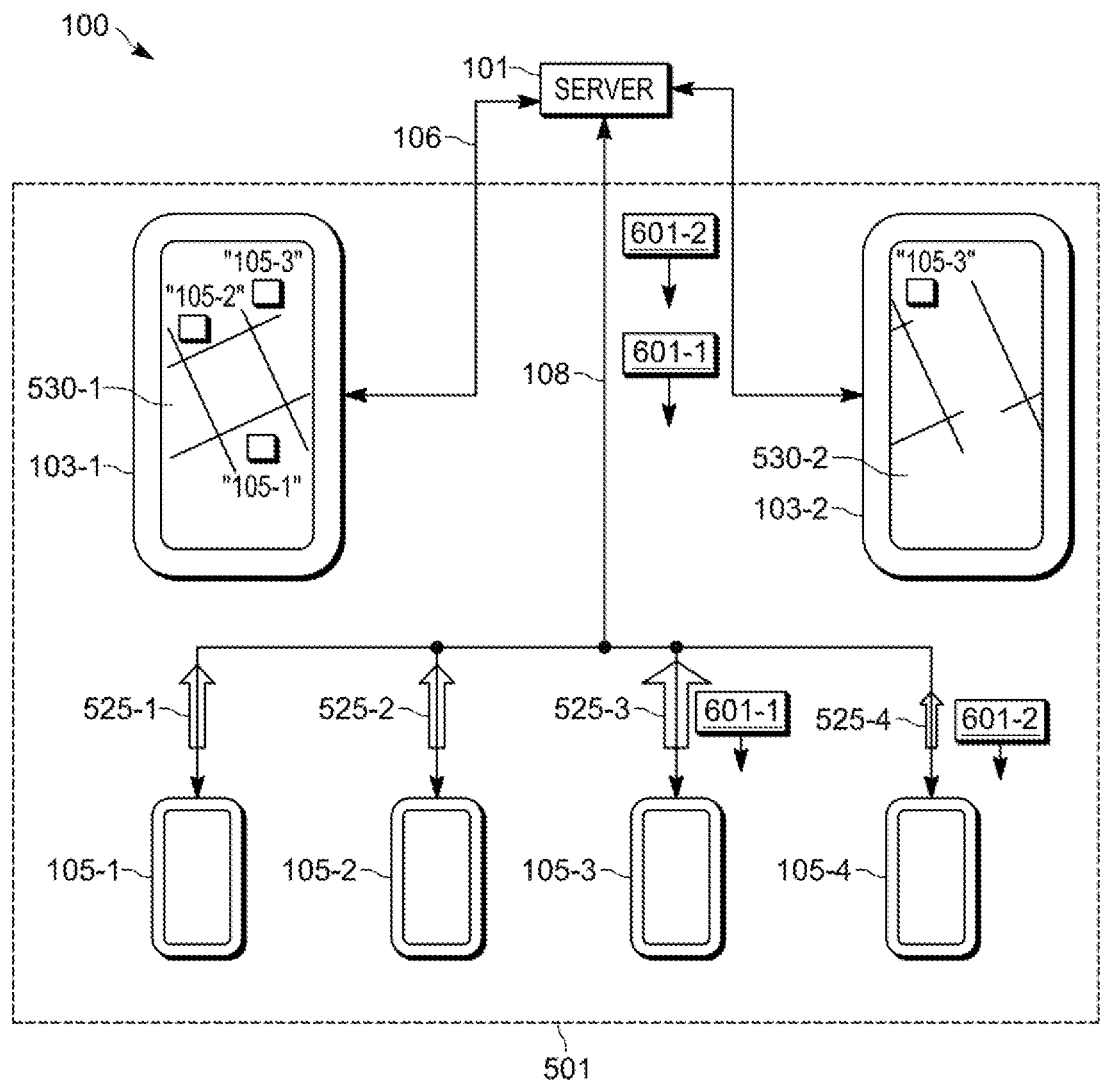
FIG. 6 depicts a portion of the system of FIG. 1 adjusting data communications of the communication devices in accordance with some alternative embodiments.

For example, attention is next directed to FIG. 6 which is substantially similar to FIG. 5 with like elements having like numbers. In FIG. 6, however, the server 101 is implementing the block 204 of the method 200, and it is assumed that the server 101 and/or the controller 120 has determined numbers of the devices 103-1, 103-2 actively watching the devices 105-1, 105-2, 105-3, 105-4, as described above.

As the device 105-3 has the largest number of devices 103-1, 103-2 actively watching it, the server 101 adjusts the data communications of the device 105-3 (e.g. at the block 204 of the method 200), for example by transmitting, to the device 105-3 a command 601-1 to increase a presence update rate including, but not limited to, a location update rate. Alternatively, the server 101 may allocate a higher uplink rate (and/or any other quality of service parameter) for the device 105-3 on a respective link 106 of the device 105-3.

Similarly, as the device 105-4 has the smallest number of devices 103-1, 103-2 actively watching it, the server 101 adjusts the data communications of the device 105-4 (e.g. at the block 204 of the method 200), for example by transmitting, to the device 105-4 a command 601-2 to decrease a presence update rate including, but not limited to, a location update rate. Alternatively, the server 101 may allocate a smaller uplink rate (and/or any other quality of service parameter) for the device 105-4 on a respective link 106 of the device 105-4.

As depicted, as the devices 105-3, 105-4 have a second highest number of devices 103-1, 103-2 actively watching them, the server 101 does not adjust their data communications. Alternatively, the server 101 may adjust their data communications to raise or lower their respective presence update rates and/or their uplink rates depending, for example, a threshold value as described above.

Either way, as depicted in FIG. 6, the data communications of the device 105-3, is altered (e.g. by raising the presence update rate, the uplink rate, and the like) as represented by the arrow 525-3 being larger in FIG. 6 as compared to FIG. 5. Similarly, the data communications of the device 105-4, is altered (e.g. by lowering the presence update rate, the uplink rate, and the like) as represented by the arrow 525-4 being smaller in FIG. 6 as compared to FIG. 5.

Put another way, the example of FIG. 5 and FIG. 6 shows that the server 101 and/or the controller 120 may be further configured to determine the number of the plurality of communication devices 103 that are actively watching the presence data associated with a given communication device 105 based on a state of the given communication device 105 relative to a remainder of the plurality of communication devices 105.

Put yet another way, the server 101 and/or the controller 120 may be further configured to adjust the data communications of a given communication device 105 based on a state of the given communication device 105 relative to a remainder of the plurality of communication devices 105 (and may further adjust the data communications of a given communication device 105 independent of the number of the devices 103 actively watching the given communication device 103 and/or may further adjust the data communications of a given communication device 105 in conjunction with a determination of the number of the devices 103 actively watching the given communication device 103).

However, rather than compare numbers of devices 103 actively watching each of the devices 105, the server 101 and/or the controller 120 may alternatively adjust their data communications based on a respective state of each of the devices 103, for example using the above described threshold values.

While in the examples described with respect to FIG. 3 to FIG. 6, a number of the devices 103 actively watching a device 105 was determined based on map data 350, 550, as well as a state of the devices 105 based on criteria external to the devices (e.g. numbers of active watcher devices 103) other criteria may be used to determine whether a device 105 is being actively watched including, but not limited to, a local state of each of the devices 105-1, 105-2, 105-3, 105-4. Such criteria may also be used to adjust data communications of the devices 105-1, 105-2, 105-3, 105-4.

Figure 7:
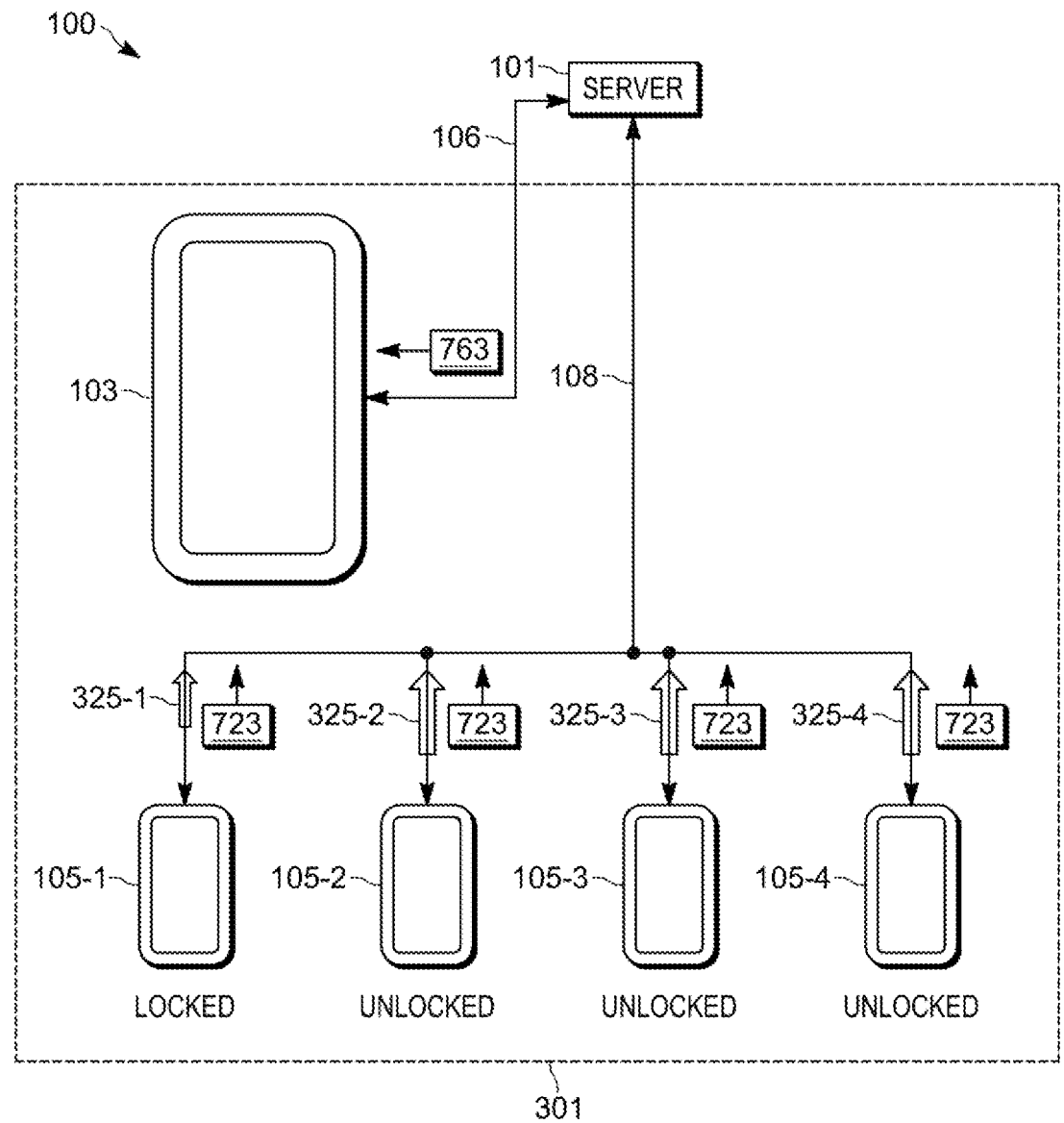
FIG. 7 depicts a portion of the system of FIG. 1 adjusting data communications of communication devices based on whether the communication devices are locked or unlocked in accordance with some embodiments.

For example, attention is next directed to FIG. 7, which is substantially similar to FIG. 3 with like elements having like numbers. However, in FIG. 7, each of the devices 105-1, 105-2, 105-3, 105-4 is transmitting respective presence data 723 that includes an indication of whether or not each device 105-1, 105-2, 105-3, 105-4 is locked or unlocked. In these embodiments, when a device 105-1, 105-2, 105-3, 105-4 is locked the server 101 at least temporarily stops the device 103 from watching a locked device 105-1, 105-2, 105-3, 105-4, for example to reduce bandwidth usage on a respective link 106 of the device 103.

Hence presence data 763 transmitted to the device 103 by the server 101 excludes presence data of locked device 105-1, 105-2, 105-3, 105-4, and/or the server 101 transmits presence data 723 of a locked device 105-1, 105-2, 105-3, 105-4 once after a device 105-1, 105-2, 105-3, 105-4 is locked to indicate to the device 103 that a device 105-1, 105-2, 105-3, 105-4 is locked. While a device 105-1, 105-2, 105-3, 105-4 is locked the device 103 no longer actively watches it. However, when a locked device 105-1, 105-2, 105-3, 105-4 is again unlocked the device 103 may again begin to actively watch it, as automatically controlled by the server 101 and/or the controller 120.

As depicted, the device 105-1 is locked and the devices 105-2, 105-3, 105-4 are unlocked, and the respective presence data 723 indicates such, as well as any other local state of the devices 105-1, 105-2, 105-3, 105-4 including, but not limited to, keyboard activity, camera data (e.g. whether or not a user is located in images acquired by a front-facing camera of each of the devices 105-1, 105-2, 105-3, 105-4), and the like.

As depicted, as the device 105-1 is locked, the server 101 and/or the controller 120 determines that a number devices 103 actively watching the device 105-1 is "0" (e.g. as the presence data 723 from the device 105-1 is no longer transmitted to the device 103) and hence adjusts the data communications of the device 105-1, for example by lowering a presence update rate and/or an uplink rate, as described above.

Similarly, as the devices 105-2, 105-3, 105-4 are each unlocked, the server 101 and/or the controller 120 determines that a number devices 103 actively watching each of the devices 105-2, 105-3, 105-4 is "1" and does not adjust the data communications of the devices 105-2, 105-3, 105-4. Hence the data communications of the device 105-1 is of a lower presence rate and/or uplink rate as the data communications of the devices 105-2, 105-3, 105-4, as represented by the arrow 325-1 being smaller than the arrows 325-2, 325-3, 325-4.

Hence, the data communications of the devices 105-1, 105-2, 105-3, 105-4 are adjusted based on a respective state, in the example based on whether or not a device 105-1, 105-2, 105-3, 105-4 is locked or not and/or how such a respective date affects the number of devices 103 actively watching the devices 105-1, 105-2, 105-3, 105-4.

Similarly, the data communications of the devices 105-1, 105-2, 105-3, 105-4 may be adjusted based on other respective states, for example based on keyboard activity, camera data, and the like.

Put yet another way, the server 101 and/or the controller 120 may be further configured to adjust the data communications of a given communication device 105 based on a respective state of the given communication device (and may further adjust the data communications of a given communication device 105 independent of the number of the devices 103 actively watching the given communication device 103 and/or may further adjust the data communications of a given communication device 105 in conjunction with a determination of the number of the devices 103 actively watching the given communication device 103).

Figure 8:
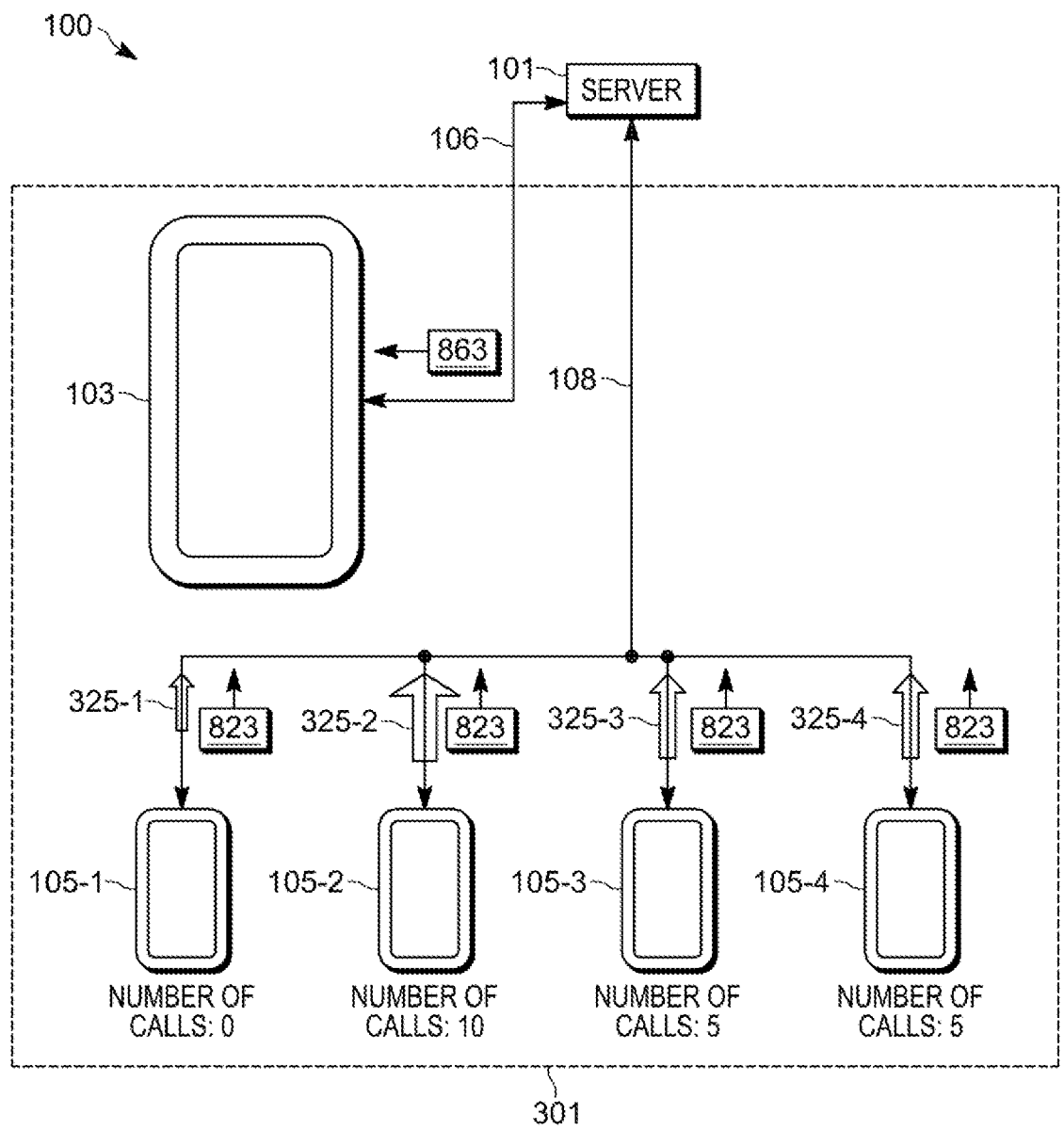
FIG. 8 depicts a portion of the system of FIG. 1 adjusting data communications of communication devices based on a number of calls to the communication devices in accordance with some embodiments.

Attention is next directed to FIG. 8, which is substantially similar to FIG. 7 with like elements having like numbers. However, in FIG. 8, each of the devices 105-1, 105-2, 105-3, 105-4 is transmitting respective presence data 823 that includes an indication of a number of times that the device 105-1, 105-2, 105-3, 105-4 was called, for example within a given time period (e.g. an hour, and the like, though the given time period may be configurable at the server 101).

In these embodiments, when a number of times that a device 105-1, 105-2, 105-3, 105-4 is called within the given time period is below a threshold number of calls (e.g. 1 time within the last hour) the server 101 at least temporarily stops the device 103 from watching such a device 105-1, 105-2, 105-3, 105-4, for example to reduce bandwidth usage on a respective link 106 of the device 103. Hence presence data 863 transmitted to the device 103 by the server 101 excludes presence data of devices 105-1, 105-2, 105-3, 105-4 which have lower calling activity (e.g. as determined by the threshold number of calls). When a device 105-1, 105-2, 105-3, 105-4 receive a larger number of calls within a given time period (e.g. as determined by the threshold number of calls), the server 101 may automatically cause the device 103 to again actively watch such a device 105-1, 105-2, 105-3, 105-4.

As depicted, as the device 105-1 has been called "0" times within the given time period, the device 105-2 has been called "10" times within the given time period, and the devices 105-3, 105-4 have each been called "5" times within the given time period. Assuming that the threshold number of calls is "1", the server 101 and/or the controller 120 stops the device 103 from actively watching the device 105-1 (e.g. as the number of calls to the device 105-1 within the given time period is below the threshold number of calls). The server 101 and/or the controller 120 hence determines that a number devices 103 actively watching the device 105-1 is "0" (e.g. as the presence data 823 from the device 105-1 is no longer transmitted to the device 103) and adjusts the data communications of the device 105-1, for example by lowering a presence update rate and/or an uplink rate, as described above, and as represented by the arrow 325-1 being smaller than the arrows 325-2, 325-3, 325-4.

Similarly, as the device 105-2, 105-3, 105-4 have each received a number of calls above the threshold number of calls, the server 101 and/or the controller 120 does not a lower presence rate and/or uplink rate of the device 105-2, 105-3, 105-4.

As depicted, however, as the device 105-2 has received a larger number of calls than the devices 105-3, 105-4, the server 101 and/or the controller 120 increases a presence update rate and/or an uplink rate of the device 105-2, as compared to the devices 105-3, 105-4, as represented by the arrow 325-2 being larger than the arrows 325-3, 325-4.

Hence, the data communications of the devices 105-1, 105-2, 105-3, 105-4 are adjusted based on a number of calls to each of the devices 105-1, 105-2, 105-3, 105-4.

While the example embodiment of FIG. 8 is described with respect to number of received calls (e.g. telephone calls), in other embodiments, the server 101 and/or the controller 120 may be configured to adjust data communications of devices 105 based on other types of messaging events including, but not limited to, a number of sent calls, a number of received text messages, a number of sent text messages, and the like.

In some embodiments, the server 101 and/or the controller 120 is further configured to determine a number of the plurality of communication devices 103 that are actively watching presence data associated with a given communication device 105 based on a number of times that a talkgroup with which the given communication device 105 is affiliated was called within a given time period.

Figure 9:
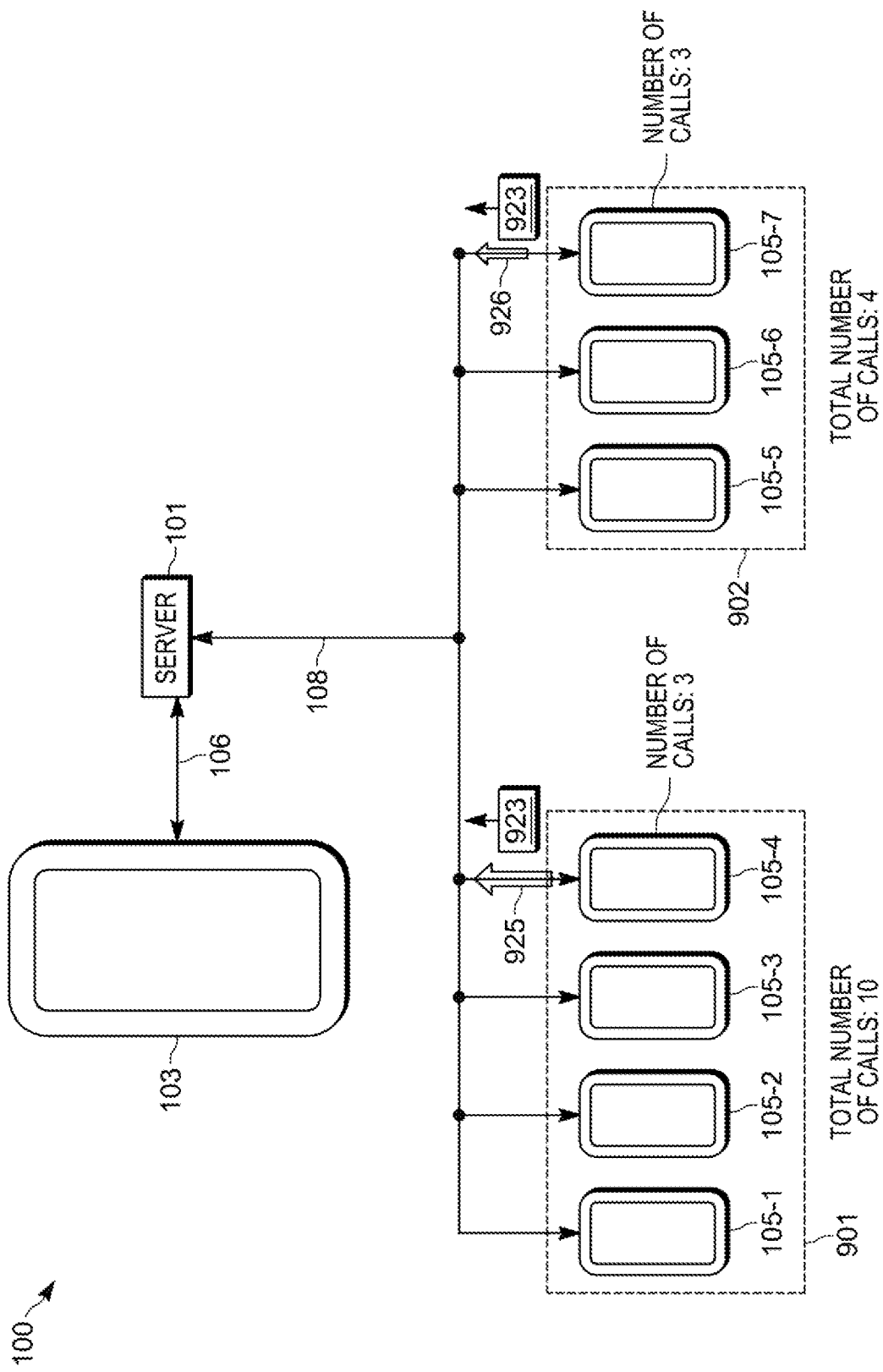
FIG. 9 depicts a portion of the system of FIG. 1 adjusting data communications of communication devices based on a number of calls to associated talkgroups in accordance with some embodiments.

For example, attention is next directed to FIG. 9 which depicts a portion of the system 100 with the devices 105-1, 105-2, 105-3, 105-4 associated with a first talkgroup 901, and the devices 105-5, 105-6, 105-7 associated with a second talkgroup 902. The device 103 may be associated with one or more the talkgroups 901, 902, however the device 103 may be associated with neither of the talkgroups 901, 902. Either way, the device 103 may be subscribed to presence data 923 from the device 105-4 of the first talkgroup 901, and further subscribed to presence data 923 of the second talkgroup 902.

As depicted, the devices 105-1, 105-2, 105-3, 105-4 associated with the first talkgroup 901 have collectively received a total number of 10 calls within a given time period, and furthermore, the devices 105-5, 105-6, 105-7 associated with the second talkgroup 902 have collectively received a total number of 4 calls within a given time period. Further, as depicted, each of the devices 105-4, 105-7 has received 3 calls within the give time period. However, as the first talkgroup 901 with which the device 105-4 is affiliated has received more total calls than the second talkgroup 902 with which the device 105-7 is affiliated, the server 101 and/or the controller 120 adjusts the data communications of each of the given communication devices 105-4, 105-7 based on the number of times that a talkgroup 901, 902 with which the given communication devices 105-4, 105-7 are affiliated was called within a given time period.

Hence, as the talkgroup 901 was called more times than the talkgroup 902, the device 105-4 is allocated a higher presence update rate and/or uplink rate than the device 105-7, as represented by the arrow 925 being larger than the arrow 926 (e.g. of the arrows 925, 926 being representative of data communications on their respective links 108).

In any event, various other criteria may be used to adjust data communications of watched devices 105 including, but not limited to: talkgroup affiliations, recent talkgroup affiliations (e.g. within a given time period), most talkgroup affiliation frequency (e.g. talkgroups may be joined, left, and rejoined) within a given time period, and the like.

Furthermore, such criteria for adjusting data communications may be weighted. For example, a number of devices 103 actively watching a device 105 as determined using map data may be weighted higher than a number of devices actively watching a device 105 based on a whether a device 105 is locked or unlocked. However, any weighting scheme is within the scope of present embodiments.

In this manner, the server 101 determines a demand for presence updates and prioritizes/de-prioritizesi the most/ least demanded presence data which may ensure that first responders have the most up-to-date presence data for devices that are most in demand, which may be critical in emergency situations.

While this may reduce delays for the most demanded presence data, the method 200 may mitigate certain types of data congestion in the system 100.

Hence, in yet further embodiments, the server 101 and/or the controller 120 may be adapted to detect when presence data associated with a device 105 has been received and determine whether older presence data from the device 105 is still in a send queue. When the older presence data from the device 105 is still in the send queue, the older presence data may be deleted in favor of the newer presence data (e.g. the new presence data may overwrite the older presence data).

Figure 10:
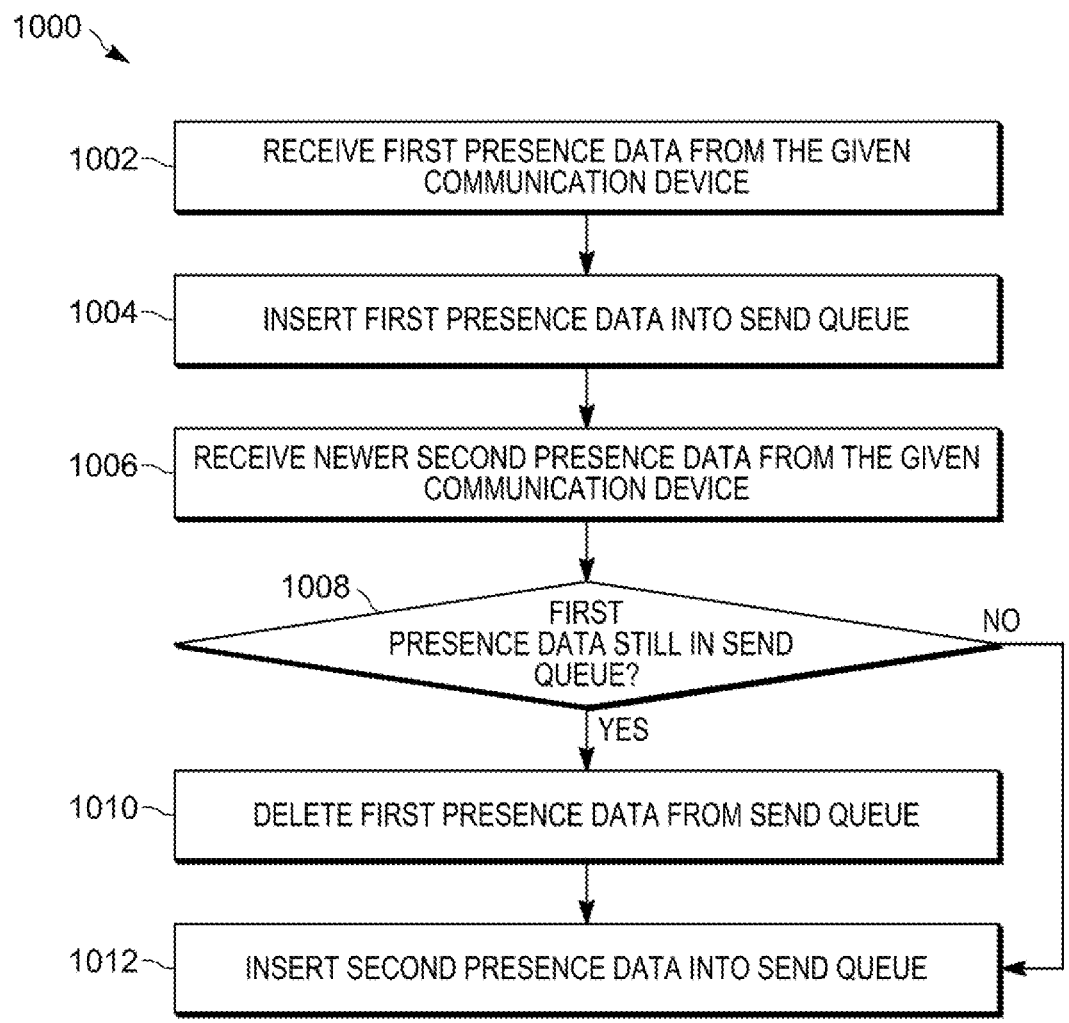
FIG. 10 is a flowchart of a method of controlling a send queue in presence systems in accordance with some embodiments.

For example, attention is now directed to FIG. 10 which depicts a flowchart representative of a method 1000 for controlling presence data in a send queue. In some embodiments, the operations of the method 1000 of FIG. 10 correspond to machine readable instructions that are executed by, for example, the server 101 of FIG. 1, and specifically by the controller 120 of the server 101. In the illustrated example, the instructions represented by the blocks of FIG. 10 are stored at the memory 122, for example, as a portion of the application 123 (and/or another application, for example a send queue management application). The method 1000 of FIG. 1 is one way in which the system 100 and/or the server 101 and/or the controller 120 is configured. Furthermore, the following discussion of the method 1000 of FIG. 10 will lead to a further understanding of the server 101, and its various components.

However, it is to be understood that the system 100 and/or the server 101 and/or the controller 120 and/or the method 1000 may be varied, and need not work exactly as discussed herein in conjunction with each other, and that such variations are within the scope of present embodiments.

Furthermore, the method 1000 of FIG. 10 need not be performed in the exact sequence as shown and likewise various blocks may be performed in parallel rather than in sequence. Accordingly, the elements of method 1000 are referred to herein as "blocks" rather than "steps".

At the block 1002, the controller 120, receives presence data from a given communication device 105.

At the block 1004, the controller 120, inserts the presence data into a send queue.

At the block 1006, the controller 120, receives newer second presence data from the given communication device 105.

At the block 1008, the controller 120 determines whether the older first presence data is still in the send queue.

When the older first presence data is still in the send queue (e.g. a "YES" decision at the block 1008), at the block 1010 (e.g. the older first presence data has not yet been transmitted), the controller 120 deletes the older first presence data from the send queue. At the block 1012, the controller 120, inserts the newer second presence data into the send queue, either at the same position as the deleted older first presence data, or in a received order (e.g. relative to presence data received from others of the devices 105).

However, returning to the block 1008, when the older first presence data is not in the send queue (e.g. a "NO" decision at the block 1008, and the older first presence data has been transmitted), the controller 120 implements the block 1012 to insert the newer second presence data into the send queue, for example in a received order.

The method 1000 may be repeated for each set of presence data received for each communication device 105.

For example, attention is next directed to FIG. 11 which depicts an example of the method 1000. In particular, a device 105 (e.g. one of the devices 105 from FIG. 1) is transmitting presence data 1125-1, 1125-2 to the server 101 using a link 108, which in turns transmits presence data received from the device 105 to a device 103 (e.g. one of the devices 103 from FIG. 1) using a link 106. As depicted, the device 105 first transmits the presence data 1125-1 and later transmits the presence data 1125-2 (e.g. according to a presence update rate). The server 101 and/or the controller 120 hence first receives the presence data 1125-1 (e.g. at the block 1002 of the method 1000) and inserts the presence data 1125-1 into a send queue 1130 (e.g. at the block 1004 of the method 1000). The send queue 1130 may be implemented using a combination of the memory 122 and the interface 124 and includes presence data 1135 received from others of the devices 105 (not depicted) to be transmitted to the depicted device 103 and/or others of the devices 103.

As depicted, the server 101 and/or the controller 120 further receives the presence data 1125-2 (e.g. at the block 1006 of the method 1000) and determines (e.g. at the block 1008 of the method 1000) whether or not any presence data from the device 105 is in the send queue 1130. Such a determination may be made as each of the presence data 1125-1, 1125-2, 1135 generally includes an identifier of a device 105 from which the presence data 1125-1, 1125-2, 1135 originates. Hence, the server 101 and/or the controller 120 may extract the identifier of the device 105 from the presence data 1125-2 and compare the identifier with identifiers stored in the presence data 1125-1, 1135 in the send queue. As the presence data 1125-1 is still in the send queue 1130 (e.g. a "YES" determination at the block 1008 of the method 1000), the server 101 and/or the controller 120 deletes the presence data 1125-1 (e.g. at the block 1010 of the method 1000) as represented by the "X" through the presence data 1125-1 in the send queue 1130, and (e.g. at the block 1012 of the method 1000) inserts the second presence data 1125-2 in the send queue 1130. As depicted, the second presence data 1125-2 is inserted in a received order (e.g. assuming the second presence data 1125-2 is received after the presence data 1135; however, in other embodiments, the second presence data 1125-2 may replace the first presence data 1125-1 in its order in the send queue 1130.

Hence, as depicted in FIG. 10 and FIG. 11, the server 101 and/or the controller 120 may be configured to: detect when newer presence data from a communication device 105, of the plurality of communication devices 103, 105, is inserted into a send queue 1130; and delete older presence data from the communication device 105 from the send queue 1130.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter

The invention claimed is:

1. A server comprising:
a communication interface configured to communicate with a plurality of communication devices; and
a controller configured to:
for a given communication device, of the plurality of communication devices, determine a number of the plurality of communication devices that are actively watching presence data associated with the given communication device based on whether a location of the given communication device is being provided at a respective map of the plurality of communication devices; and
based on the number, adjust data communications of the given communication device.

2. The server of claim 1, wherein the plurality of communication devices that are actively watching the presence data associated with the given communication device includes those communication devices that were previously watching the presence data associated with the given communication device within a given time period.

3. The server of claim 1, wherein the controller is further configured to adjust the data communications of the given communication device based on a state of the given communication device relative to a remainder of the plurality of communication devices.

4. The server of claim 1, wherein the controller is further configured to adjust the data communications of the given communication device based on one or more of: a respective state of each of the plurality of communication devices; and a respective locked state or unlocked state of each of the plurality of communication devices.

5. The server of claim 1, wherein the controller is further configured to adjust the data communications of the given communication device based on one or more of: a number of times that a talkgroup with which the given communication device is affiliated was called within a given time period; and a respective number of times that the given communication device was called within the given time period.

6. The server of claim 1, wherein the controller is further configured to adjust the data communications of the given communication device by modifying one or more of an application layer parameter and a transport layer parameter of the given communication device.

7. The server of claim 1, wherein the controller is further configured to cause the data communications of the given communication device to be adjusted by causing a decrease of a presence update rate of the given communication device when the number is below a given threshold value.

8. The server of claim 1, wherein the controller is further configured to cause the data communications of the given communication device to be adjusted by causing allocation of a lower uplink rate of the given communication device when the number is below a given threshold value.

9. The server of claim 1, wherein the controller is further configured to cause the data communications of the given communication device to be adjusted by sending a command to the given communication device to decrease a presence update rate when the number is below a given threshold value.

10. The server of claim 1, wherein the controller is further configured to: detect when newer presence data from a communication device, of the plurality of communication devices, is inserted into a send queue; and delete older presence data from the communication device from the send queue.

11. A method comprising:
for a given communication device, of a plurality of communication devices, determining, using a controller, a number of the plurality of communication devices that are actively watching presence data associated with the given communication device based on whether a location of the given communication device is being provided at a respective map of the plurality of communication devices; and
based on the number, adjusting, using the controller, data communications of the given communication device.

12. The method of claim 11, wherein the plurality of communication devices that are actively watching the presence data associated with the given communication device includes those communication devices that were previously watching the presence data associated with the given communication device within a given time period.

13. The method of claim 11, further comprising adjusting, using the controller, the data communications of the given communication device based on a state of the given communication device relative to a remainder of the plurality of communication devices.

14. The method of claim 11, further comprising adjusting, using the controller, the data communications of the given communication device based on one or more of: a respective state of each of the plurality of communication devices; and a respective locked state or unlocked state of each of the plurality of communication devices.

15. The method of claim 11, further comprising adjusting, using the controller, the data communications of the given communication device based on one or more of: a number of times that a talkgroup with which the given communication device is affiliated was called within a given time period; and a respective number of times that the given communication device was called within the given time period.

16. The method of claim 11, further comprising adjusting, using the controller, the data communications of the given communication device by modifying one or more of an application layer parameter and a transport layer parameter of the given communication device.

17. The method of claim 11, further comprising causing, using the controller, the data communications of the given communication device to be adjusted by one or more of:
causing a decrease of a presence update rate of the given communication device when the number is below a given threshold value;
causing allocation of a lower uplink rate of the given communication device when the number is below a given threshold value; and
sending a command to the given communication device to decrease a presence update rate when the number is below a given threshold value.

18. The method of claim 11, further comprising:
detecting, using the controller, when newer presence data from a communication device, of the plurality of communication devices, is inserted into a send queue; and
deleting older presence data from the communication device from the send queue.

* * * * *